United States Patent [19]

Utsunomiya

[11] Patent Number: 5,099,141
[45] Date of Patent: Mar. 24, 1992

[54] CLOCK SIGNAL SWITCHING CIRCUIT

[75] Inventor: Yukio Utsunomiya, Tokyo, Japan

[73] Assignee: Kabushiki Kaisha Toshiba, Kawasaki, Japan

[21] Appl. No.: 406,608

[22] Filed: Sep. 13, 1989

[30] Foreign Application Priority Data

Sep. 28, 1988 [JP] Japan .................. 63-240713

[51] Int. Cl.$^5$ .................. H03K 5/13; H03K 17/00
[52] U.S. Cl. .................. 307/269; 307/243; 328/104; 328/137; 328/154; 328/63; 331/49
[58] Field of Search .................. 307/480, 269, 243; 328/61, 63, 72, 104, 137, 154; 331/49

[56] References Cited

U.S. PATENT DOCUMENTS

| | | | |
|---|---|---|---|
| 3,708,686 | 1/1973 | Butler, Jr. et al. | 307/525 |
| 4,419,629 | 12/1983 | O'Brien | 331/49 |
| 4,748,417 | 5/1988 | Spengler | 307/480 |
| 4,767,918 | 8/1988 | Kushima et al. | 235/441 |
| 4,789,984 | 12/1988 | Swartz | 328/104 |
| 4,820,992 | 4/1989 | Avis | 328/137 |
| 4,853,653 | 8/1989 | Maher | 328/137 |
| 4,855,615 | 8/1989 | Humpleman | 307/480 |
| 4,988,901 | 1/1991 | Kamuro et al. | 328/104 |

FOREIGN PATENT DOCUMENTS

0117514  5/1988  Japan .................. 307/480

*Primary Examiner*—Timothy P. Callahan
*Attorney, Agent, or Firm*—Cushman, Darby & Cushman

[57] ABSTRACT

A clock signal switching circuit having input terminals to receive a first clock signal of a first frequency, a second clock signal of a second frequency, and a frequency switching signal and an output terminal to output one of the first clock signal and second clock signal, wherein the output of the clock signal switching circuit is selected to be one of the first and second clock signals by the frequency switching signal. The clock signal switching circuit includes a first switching circuit which receives the first clock signal and the frequency switching signal and which outputs the first clock signal when not received the frequency switching signal and which interrupts the first clock signal when received the frequency switching signal, with the output of the first switching circuit being switched in synchronization with the first clock signal, and a second switching circuit which receives the second clock signal and the freqnency switching signal and which outputs the second clock signal when received the frequency switching signal and which interrupts the second clock signal when not received the frequency switching signal, wherein the second switching circuit outputs the second clock signal after the first switching circuit has interrupted the first clock signal and interrupts the output of the second clock signal before the first switching circuit outputs the first clock signal, with the output of the second switching circuit being switched in synchronization with the second clock signal.

1 Claim, 5 Drawing Sheets

CLOCK SIGNAL SWITCHING CIRCUIT

BACKGROUND OF THE INVENTION

1. Field of the Invention

The present invention relates to a clock signal switching circuit which switches between clock signals having different frequencies to select a suitable clock signal for operating IC cards, for use in, for instance, IC card reader/writers.

2. Description of the Related Art

Although IC cards in which CPUs and memories are housed are frequently used as prepaid cards, there are still some portions which are not standardized. For instance, there by be two clock frequencies to operate the CPU, 4.9152 MHz and 3.579545 MHz. For this reason, clock oscillator circuits for each of the above two frequencies are provided in the reader/writers used for writing and reading information for IC cards. After an IC card has been inserted into the reader/writer, they first carry out a check to find out which operating clock frequency is being used, and then operate the CPU in the IC card using the correct clock frequency.

The clock signal switching circuit is used to determine which clock frequency to use, and, then to switch to a clock of the correct frequency. For the construction of such a circuit, the one shown in FIG. 1, for instance, could be considered.

In FIG. 1, a numeral 1 denotes an input terminal for a first clock signal of 4.9152 MHz (hereafter called "the $f_1$ clock signal"), a numeral 2 denotes an input terminal for a second clock signal of 3.579545 MHz (hereafter called "the $f_2$ clock signal"), and a numeral 3 denotes an input terminal for a frequency switching signal (hereafter called simply "the switching signal"). The $f_1$ clock signal input terminal 1 and switching signal input terminal 3 are connected to the input terminals of a first NAND gate 4. The $f_2$ clock signal input terminals is connected to one of the input terminal of a second NAND gate 5 and the switching signal input terminal 3 is connected to the other input terminal of the second NAND gate 5 via an inverter 6. Also, the output terminals of the first and second NAND gates 4 and 5 are each connected to respective input terminals of a third NAND gate 7. Either the $f_1$ clock signal or $f_2$ clock signal is output by the output terminal of the third NAND gate 7.

FIG. 2 shows a timing chart for each signal in the above clock signal switching circuit. In FIG. 2 (a) shows the $f_1$ clock signal, (b) shows the $f_2$ clock signal, and (c) shows the switching signal. The switching signal (c) is composed a signal which varies between the two levels of an H level and an L level. When the switching signal (c) is at the H level, first NAND gate 4 opens and the $f_1$ clock signal (a) is output from its output terminal. At the same time, second NAND gate 5 closes and its output becomes the H level, and thus the $f_1$ clock signal is output from third NAND gate 7.

When the switching signal (c) switches from the H level to the L level during the output of the $f_1$ clock signal, the first NAND gate 4 immediately closes and its output becomes H level as shown by (d) in FIG. 2. At the same time, second NAND gate 5 opens and the $f_2$ clock signal (b) is output from its output terminal as shown by (e) in FIG. 2, and thus the $f_2$ clock signal (b) is output from third NAND gate 7 by switching as shown by (f) in FIG. 2. When the switching signal (c) switches from the L level to the H level during the output of the $f_2$ clock signal (b), first NAND gate 4 immediately opens and second NAND gate 5 closes. Thus the circuit returns to the previous state and the $f_1$ clock signal (a) is output from third NAND gate 7 by switching.

As described above, the prior art clock signal switching circuit was designed so that when the switching signal switched from the H level to the L level, or vice versa, first NAND gate 4 and second NAND gate 5 immediately opened or closed and thus the $f_1$ clock signal or the $f_2$ clock signal were immediately output from third NAND gate 7. For this reason, as shown by the (*) signs in FIG. 2(f), a variable portion of clock width which differed from the clock width of either the $f_1$ clock signal (a) or the $f_2$ clock signal (b) occured during the switching between the $f_1$ clock signal and the $f_2$ clock signal, depending on the timing of the switching. Consequently, there was a risk of malfunction occurring in the CPU of an IC card with this type of clock. Therefore, when switching of the clock signal in an IC card reader/writer required, the IC card was temporarily reset by a reset signal as shown by (g) in FIG. 2. Then, after the clock frequency had been switched, the IC card was started by releasing this reset. However, executing this type of reset operation, led to an increase in the load on the software and, at the same time, led to increased processing time.

SUMMARY OF THE INVENTION

It is an object of the present invention to provide a clock signal switching circuit in which a first clock signal or a second clock signal can be correctly output by switching means without the occurence of variable portions of clock widths in the clock signal.

According to the present invention, there is provided a clock signal switching circuit having input terminals to receive a first clock signal of a first frequency, a second clock signal of a second frequency, and a frequency switching signal and an output terminal to output one of the first clock signal and second clock signal, wherein the output of the clock signal switching circuit is selected to be one of the first and second clock signals by the frequency switching signal, the circuit comprises first switching means which receives the first clock signal and the frequency switching signal and which outputs the first clock signal when so directed by the frequency switching signal and which interrupts the first clock signal when directed by the frequency switching signal, with the output of the first switching means being switched in synchronization with the first clock signal; and second switching means which receives the second clock signal and the frequency switching signal and which outputs the second clock signal when directed the frequency switching signal and which interrupts the second clock signal when directed by the frequency switching signal, wherein the second switching means outputs the second clock signal after the first switching means has interrupted the first clock signal and interrupts the output of the second clock signal before the first switching means outputs the first clock signal, with the output of the second switching means being switched in synchronization with the second clock signal.

BRIEF DESCRIPTION OF THE DRAWINGS

FIGS. 3 to 5 show an embodiment of a clock signal switching circuit according to the present invention in which:

FIG. 3 is a block diagram;

FIG. 4 is a circuit diagram; and

FIG. 5 is a timing chart for the clock signal and the switching signal.

DETAILED DESCRIPTION OF THE PREFERRED EMBODIMENT

A preferred embodiment of the present invention will now be described in more detail with reference to the accompanying drawings.

Figure 1:
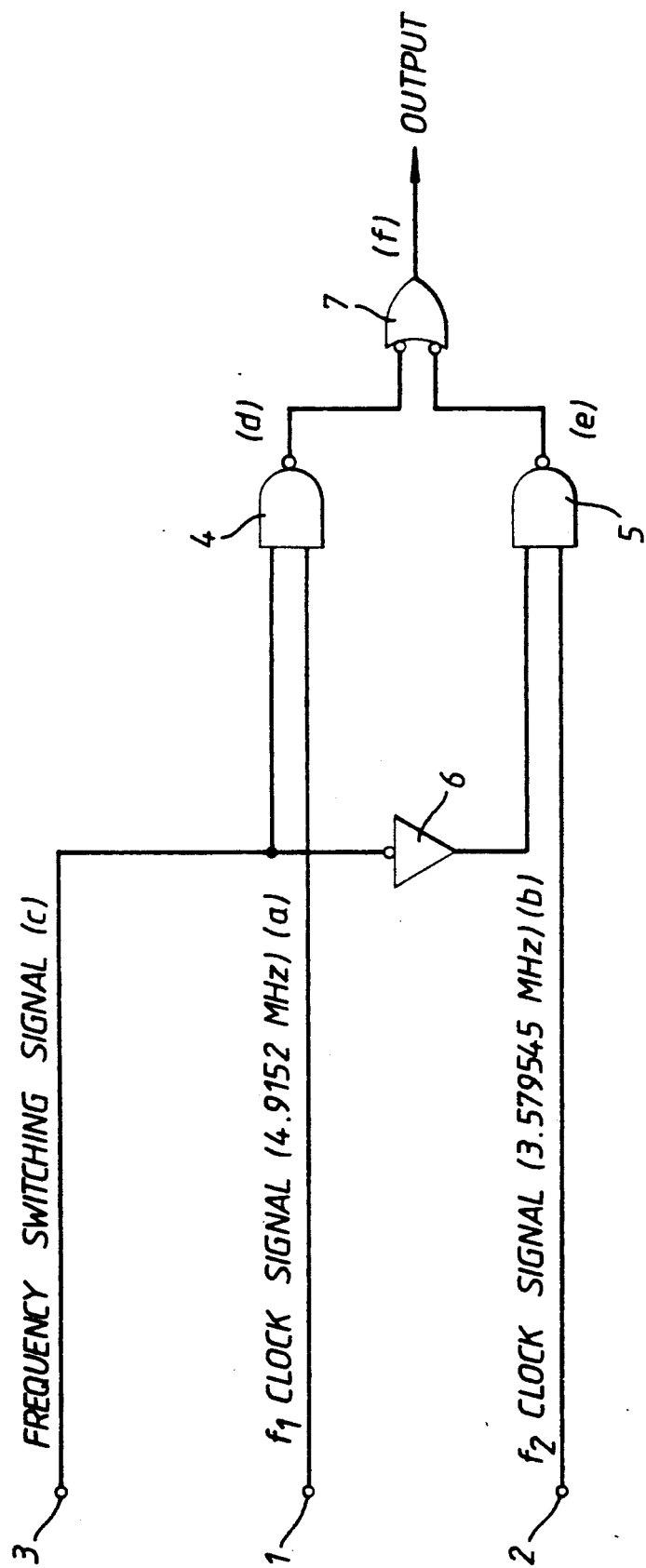
FIG. 1 is a circuit diagram showing a clock signal switching circuit in the prior art.
Figure 2:
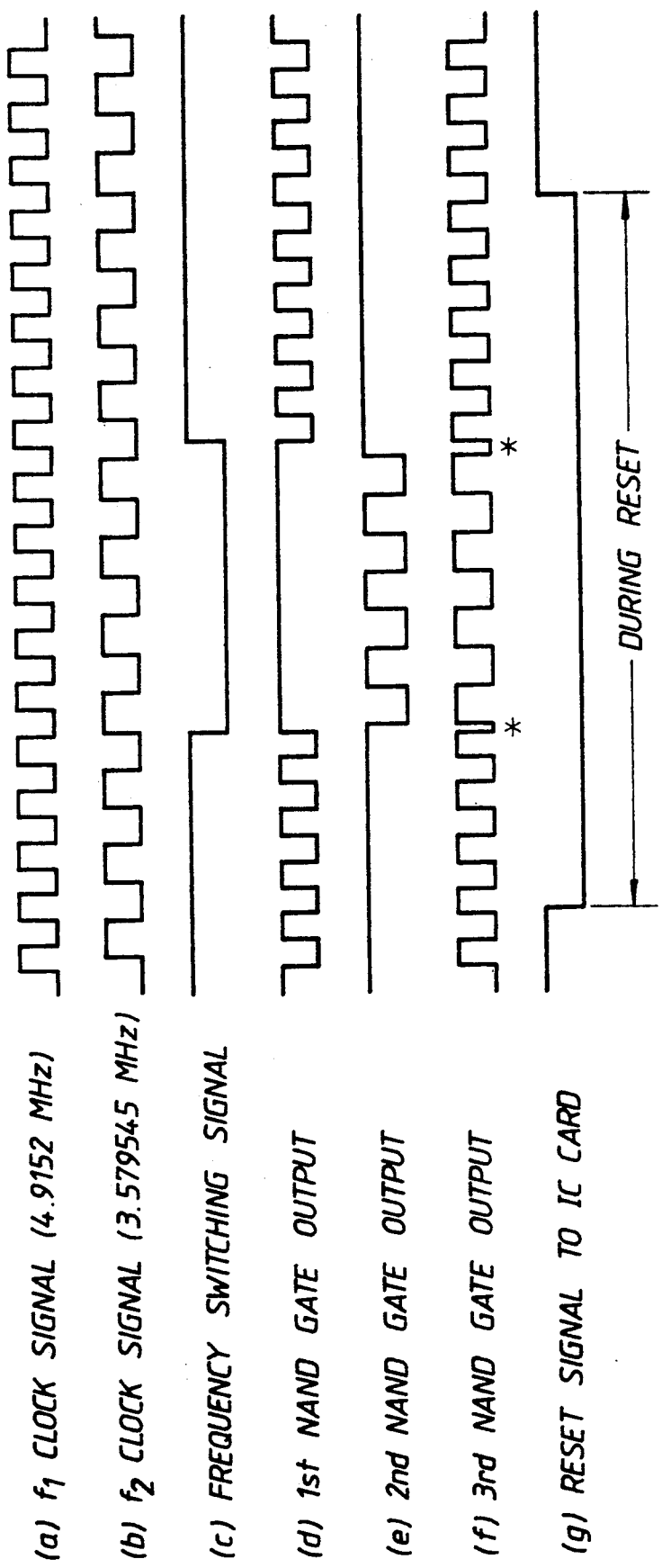
FIG. 2 is a timing chart for the clock signal and the switching signal in the clock signal switching circuit shown in FIG. 1.
Figure 3:
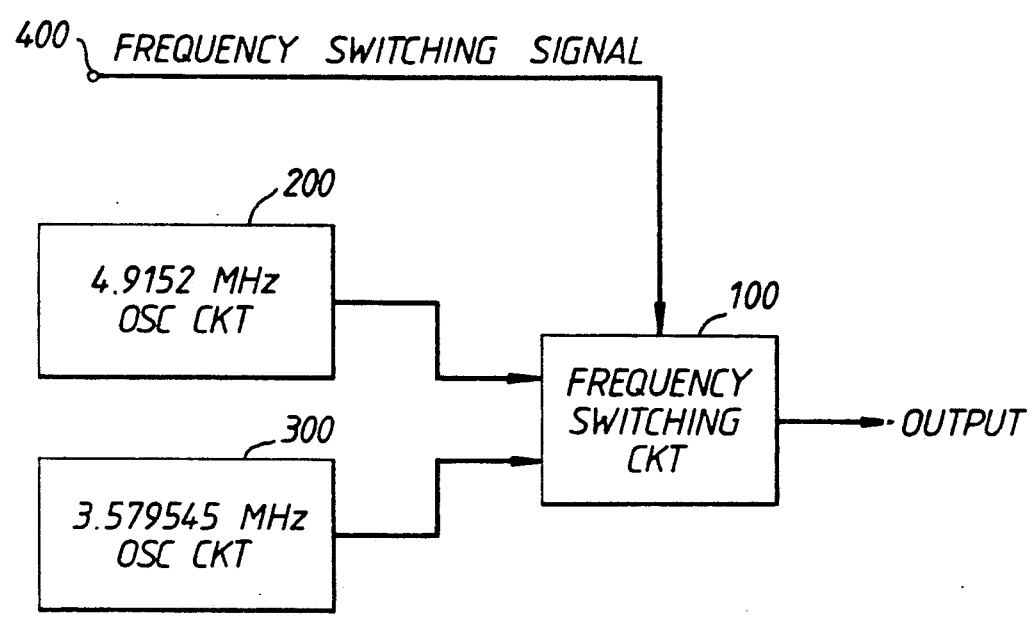

As shown in FIG. 3, an $f_1$ clock oscillator circuit 200 generates a first clock signal of 4.9152 MHz and $f_2$ clock oscillator circuit 300 generates a second clock signal of 3.579545 MHz. The $f_1$ clock oscillator circuit 200 and $f_2$ clock oscillator circuit 300 are connected to a clock signal switching circuit 100. A switching signal can be input from a switching signal input terminal 400 to clock signal switching circuit 100. The switching signal is composed of a signal which varies between two levels an H level and an L level. Clock signal switching circuit 100 is designed to output the first clock signal $f_1$ when the switching signal is at an H level and to switch to and output second clock signal $f_2$ when the switching signal is at an L level.

Figure 4:
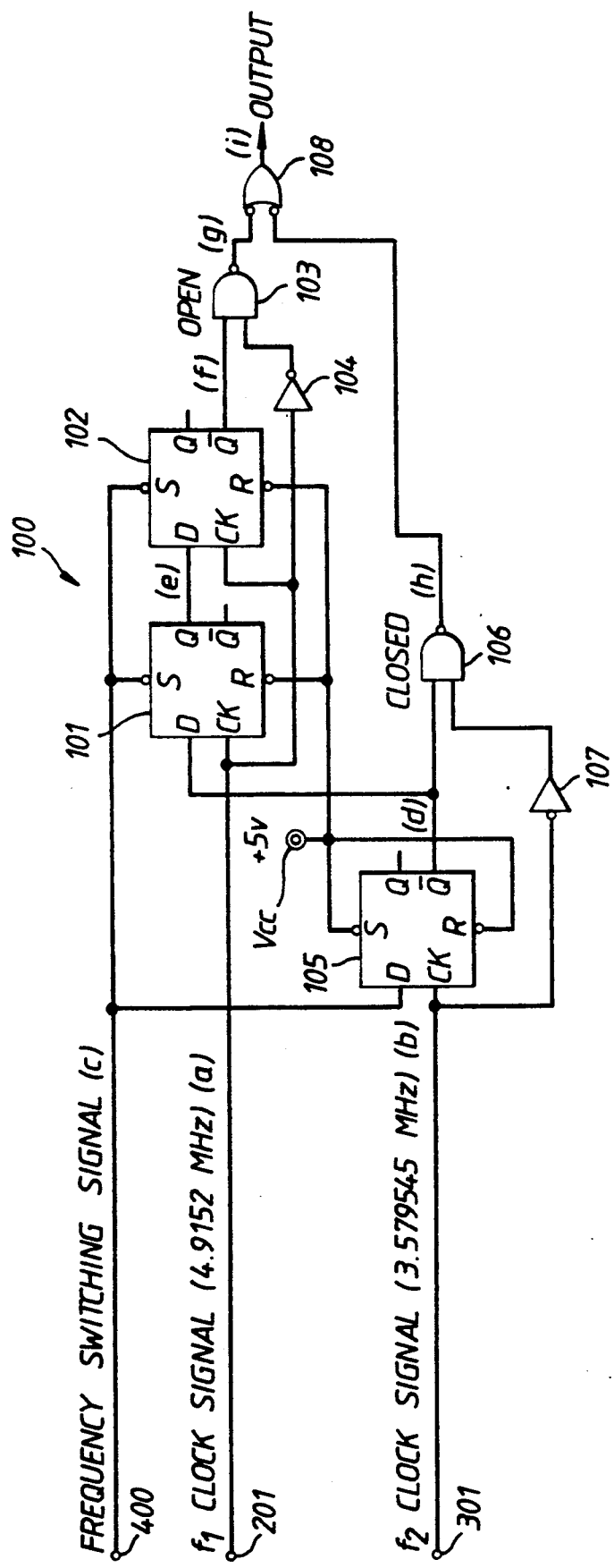

The internal construction of the clock signal switching circuit 100 is described with reference to FIG. 4. An $f_1$ clock input terminal 201 is connected to the CK input terminal of a first flip-flop 101 which is a D-type flip-flop, and also connected to the CK input terminal of a second flip-flop 102 which is a D-type flip-flop. The Q output terminal of first flip-flop 101 is connected to the D input terminal of second flip-flop 102. The $\overline{Q}$ output terminal of second flip-flop 102 is connected to one of the input terminals of a first NAND gate 103. The $f_1$ clock terminal 201 is also connected to the other input terminal of first NAND gate 103 via an inverter 104. A first switching means is composed of first flip-flop 101, second flip-flop 102, first NAND gate 103 and inverter 104. The first switching means switches first clock signal $f_1$ input from $f_1$ clock input terminal 201 ON and OFF.

The $f_2$ clock input terminal 301 is connected to the CK input terminal of a third flip-flop 105 which is a D-type flip-flop. The $\overline{Q}$ output terminal of third flip-flop 105 is connected to one of the input terminals of a second NAND gate 106. The $f_2$ clock input terminal 301 is also connected to the other input terminal of second NAND gate 106 via an inverter 107. A second switching means is composed of third flip-flop 105, second NAND gate 106 and inverter 107. The second switching means switches the $f_2$ clock signal input from $f_2$ clock terminal 301 ON and OFF.

The Q output terminal of third flip-flop 105 is also connected to the D input terminal in first flip-flop 101. The input terminal for power voltage Vcc is connected to the S (set) input terminal and the R (reset) input terminal in third flip-flop 105, and to the respective R input terminals in first and second flip-flops 101 and 102.

Switching signal input terminal 400 is connected to the respective S input terminals in first and second flip-flops 101 and 102, and to the D input terminal of third flip-flop 105.

The respective output terminals of first and second NAND gates 103 and 106 are connected to the input terminals of a third NAND gate 108. Either the $f_1$ clock signal or the $f_2$ clock signal are output by the output terminal of third NAND gate 108.

Figure 5:
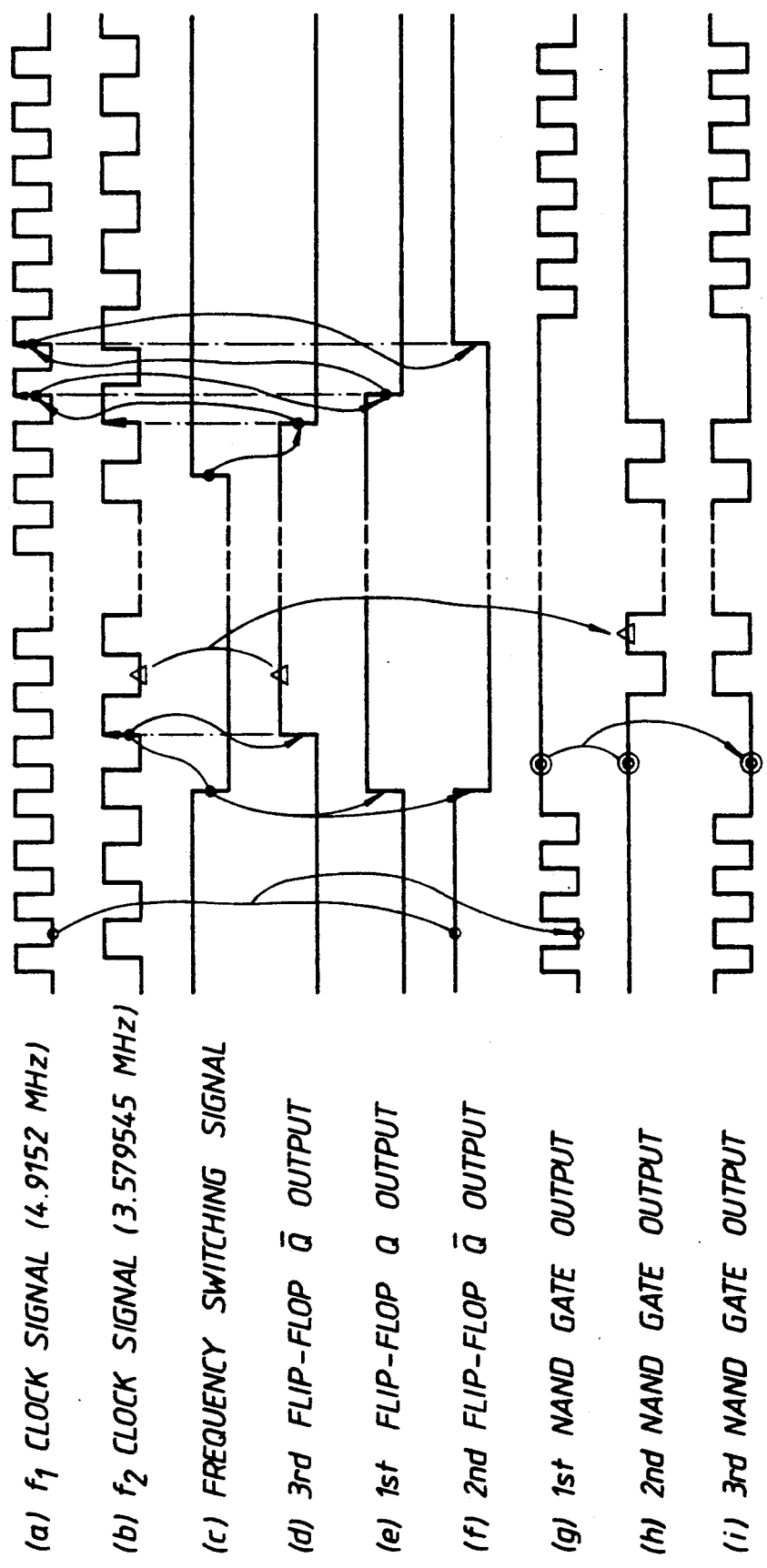

The operation of a clock signal switching circuit with the above composition is described with reference to FIG. 5. In FIG. 5, (a) shows the $f_1$ clock signal, (b) shows the $f_2$ clock signal and (c) shows the switching signal, respectively.

When the switching signal from terminal 400 is the H level, the $\overline{Q}$ output of third flip-flop 105 becomes the L level, and second NAND gate 106 will close. At the same time, with the Q output of first flip-flop 101 at the L level, the $\overline{Q}$ output of second flip-flop 102 becomes the H level, and first NAND gate 103 will open. At this time, since third NAND gate 108 also opens because the output of second NAND gate 106 has become H level, the $f_1$ clock signal will be output from third NAND gate 108 (FIG. 5(g)).

When the switching signal from terminal 400 changes to an L level from an H level during the outputting of the $f_1$ clock signal, this L level switching signal is input to the S input terminals of first and second flip-flops 101 and 102. The $\overline{Q}$ output of second flip-flop 102 becomes the L level (FIG. 5(f)), and the output of the $f_1$ clock signal is stopped by the closing of first NAND gate 103. After the stopping of the $f_1$ clock signal, the $\overline{Q}$ output of third flip-flop 105 changes to the H level in synchronization with the rising of the $f_2$ clock signal (FIG. 5(d)), and second NAND gate 106 opens. At this time, since third NAND gate 108 opens because the output of first NAND gate 103 has become the H level, the $f_2$ clock signal is output from third NAND gate 108 (FIG. 5(h)).

When the switching signal from terminal 400 changes to an H level from an L level during the outputting of the $f_2$ clock signal, the $\overline{Q}$ output of third flip-flop 105 changes to the L level in synchronization with the rising of this $f_2$ clock signal (FIG. 5(d)), and the output of the $f_2$ clock signal is stopped by the closing of second NAND gate 106. Then, after the stopping of the $f_2$ clock signal, in synchronization with the rising of the $f_1$ clock signal, the Q output of first flip-flop 101 changes to the L level, the $\overline{Q}$ output of second flip-flop 102 changes to the H level (FIGS. 5(e) and 5(f)), and first NAND gate 103 opens. At this time, since, in the same way as mentioned above, third NAND gate 108 opens, the $f_1$ clock signal is output from third NAND gate 108 (FIG. 5(g)).

In this way, when the switching signal changes between the H level and the L level, only after the clock signal which is then being output has stopped does the switching means, which will output the next clock signal, open in synchronization with the clock signal which is to be output. Therefore, an $f_1$ clock signal or an $f_2$ clock signal can be correctly output, without the occurrence of variable portions of clock widths (FIG. 5(i)).

Consequently, when used in IC card reader/writers, there is no longer a requirement for temporary resetting of the IC card with the aim of preventing malfanctions when switching clock frequencies. Thus, the load on the software is reduced and it is possible to shorten the processing time.

What is claimed is:

1. A method for switching the output of a clock signal switching circuit between a first and a second clock signal in response to a change in the level of a frequency switching signal, comprising the steps of:

interrupting the output of the first clock signal when the frequency switching signal changes from a first level to a second level before the next pulse in the first clock signal;

after the first clock signal has been interrupted, outputting the second clock signal where the time between the output from said switching circuit of a falling edge of the first clock signal and a rising edge of the second clock signal is guaranteed to be a minimum of an active portion of the second clock signal input to said switching circuit, and to be a maximum of a period of the second clock signal plus the active portion of the second clock signal;

interrupting the outputting of the second clock signal when the frequency switching signal returns to the first level within a maximum of the period of the second clock signal; and outputting the first clock signal after the second signal has been interrupted where the time between the output from the said switching circuit of the falling edge of the second clock signal and the rising edge of the first clock signal is guaranteed to be a minimum of a period of the first clock signal plus the active portion of the first clock signal input to said switching circuit and to be a maximum of the period of the second clock signal plus two periods of the first clock signal plus the active portion of the first clock signal input into said switching circuit;

wherein the output and interrupting of the second clock signal and the output of the first clock signal is performed in synchronization with the first and second and first clock signals, respectively.

* * * * *